May 12, 1959     D. W. HAMM     2,886,384

PISTON RINGS

Filed June 2, 1958

INVENTOR.
Douglas W. Hamm
BY

ATTORNEYS

United States Patent Office

2,886,384
Patented May 12, 1959

2,886,384

PISTON RINGS

Douglas W. Hamm, Muskegon Heights, Mich., assignor to Muskegon Piston Ring Company, Muskegon, Mich., a corporation of Michigan Application June 2, 1958, Serial No. 739,276

4 Claims. (Cl. 309—45)

This invention relates to piston rings of the three component type having a pair of parted rails and a parted, resilient spacer-expander for supporting the rails. More particularly, this invention is directed to the construction of the spacer-expander.

In the design and manufacture of automotive engines, the effectiveness of the piston ring as a seal between the combustion chamber and the crankcase is vitally important to the efficiency of the engine. As the compression ratio of engines has increased, the problems of developing piston rings capable of effecting an adequate seal have multiplied. The vacuum tending to draw lubricant past and around the rings and the combustion chamber pressures tending to cause blow-by past the rings have greatly increased. Further, longer periods of sustained high speed operation have increased the inertia problems created by the weight of the rings.

This invention provides a piston ring having markedly improved characteristics for these severe operating conditions. The object of the invention is to improve the spacer-expander for these rings. It provides a spacer-expander of lighter weight without sacrificing flexibility or radial tension. The maintenance of flexibility is important in assuring a more even distribution of radial thrust against the rails, forcing them to maintain a close sealing contact with the cylinder walls at all times. The reduction in weight permits the ring to reverse direction at the end of each stroke with less distortion and less binding between the ring structure and the side walls of the ring groove. This increases ring efficiency and reduces wear.

This invention provides a spacer-expander having a high degree of openness. This materially reduces the accumulation of carbon deposits which interfere with the ring's operation. Such deposits dissipate the radial thrust of the spacer-expander and cause binding between the rails and the spacer-expander and the rails and the side walls of the ring groove. Such deposits also prevent proper drainage of lubricant from between the rails.

These and other objects and advantages of this invention will be understood by those acquainted with the design and manufacture of piston rings upon reading the following specification and the accompanying drawings.

Figure 1:
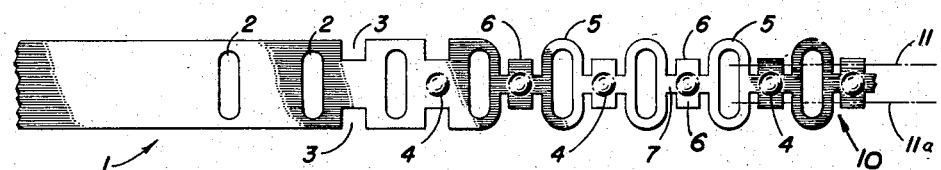
Fig. 1 is a plan view of a strip of stock for the spacer-expander illustrating the progressive steps in the fabrication of the blank therefrom.

In executing this invention, there is provided a piston ring having a pair of parted rails and a parted spacer-expander supporting the rails. The spacer-expander consists of a plurality of loops or rings joined together by webs located along the centerline of the spacer-expander blank. The end portions of the loops are bent along lines parallel to the centerline of the blank, giving the structure a U-shaped cross section with the connecting webs forming the bight portion of the U along the radial inner periphery of the structure. The end portions of the loops form the rail side supports.

Tangs project in opposite directions from each of the webs. The ends of these tangs extend beyond the surfaces of the rail contacting surfaces of the loops to serve as rail stops or pads.

In the drawings, the numeral 1 refers to a ribbon-like strip of stock. This stock is a spring steel or other material having suitable resilient characteristics. It will be recognized that the following description of the forming of this stock into a blank is merely illustrative since many variations and arrangements of the steps described may be employed with the same final result.

The stock is passed through a succession of dies. These first form the spaced, elongated apertures 2 which ultimately become the centers of the elongated annuli 5. The edge margins of the stock are then notched at 3. The notches 3 are formed in pairs, one on each side of the stock 1. The notches 3 have the same spacing as the apertures 2 and are located midway between them. Dimples 4 are formed midway between each pair of the notches 3.

The stock 1 is then cut to define the outer edges of the annuli 5 and of the tangs 6. The tangs 6 are located midway between the annuli 5 and, at their base, are integral with the connecting webs 7. The connecting webs 7 are symmetrical about the centerline of the stock and connect one annulus 5 to another. The length of the tangs 6 is determined by the depth of the notches 3 since the botttoms of the notches become the ends of the tangs.

The end portions of the tangs are inclined slightly to the plane of the stock in the same direction as the material of the stock is offset in forming the dimples 4. The purpose of this will be described more fully hereinafter.

Figure 4:
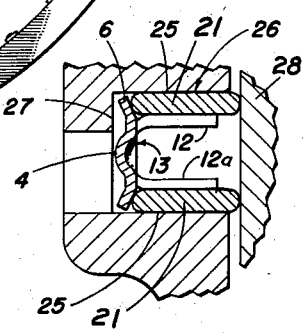
Fig. 4 is a fragmentary sectional elevation view of the spacer-expander installed in the ring groove of a piston.
Figure 3:
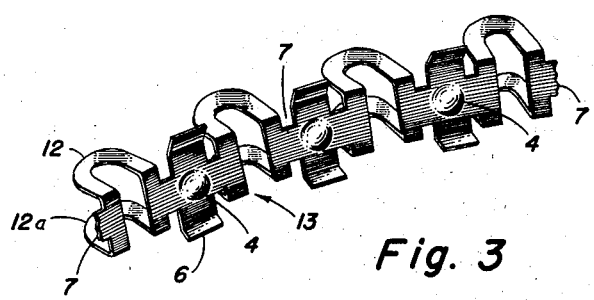
Fig. 3 is an enlarged fragmentary oblique view of the spacer-expander.

The result of this forming of the stock 1 is a spacer-expander blank 10 as illustrated at the right hand end of Fig. 1. The completed blank 10 is passed as a continuous strip through suitable dies to bend over the edges of the annuli along lines 11 and 11a (Fig. 1) forming the structure into a cross sectional U-shape. The bent over ends of the annuli, forming the ends of the U, are parallel and become the rail seats 12 and 12a of the finished spacer-expander (Figs. 3 and 4). The connecting webs 7 form the web or bight portion 13 (Fig. 3) of the spacer-expander. The rail seats 12 and 12a are flat and parallel to each other.

Figure 2:
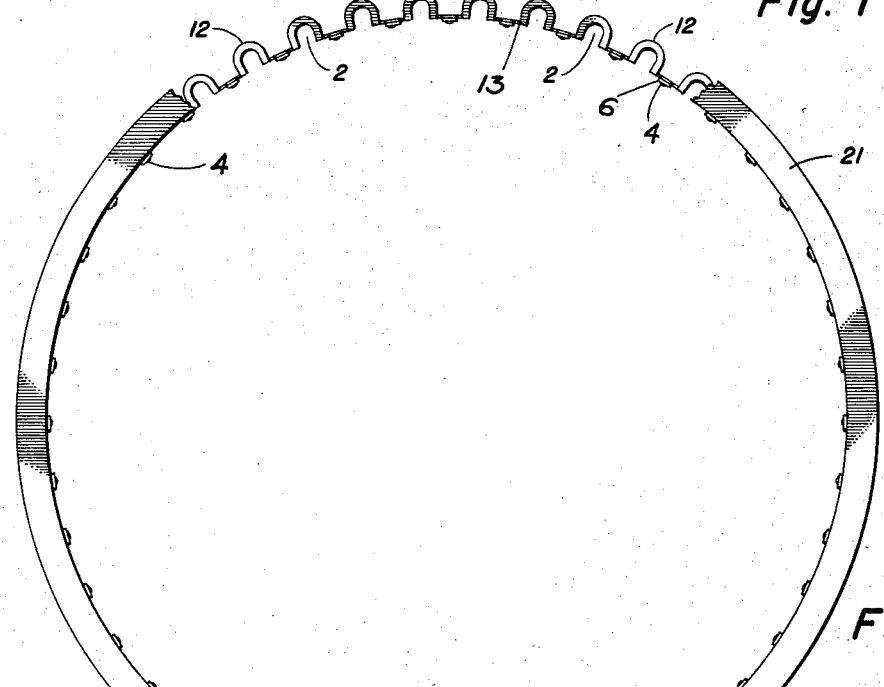
Fig. 2 is a plan view of a piston ring incorporating this invention with a portion of the rails broken away.

The completed spacer-expander form is now coiled and cut to length. The coiling is so performed that the bight portion 13 becomes the radial inner periphery of the spacer-expander and the ends of the annuli 5 the radial outer periphery. The completed spacer-expander is parted at 20 and in relaxed condition has a gap at this joint (Fig. 2).

It will be noted that the continuity of the spacer-expander structure alternates between its radial inner and outer margins. The webs 7 provide spaced sections of structural continuity along the inner radial periphery of the spacer-expander while the rounded ends of the rail seats 12 and 12a provide structural continuity at the outer radial periphery between the spaced sections formed by the webs 7. This makes the structure both flexible and resilient. The rounded shape of the ends of the rail seats 12 and 12a is particularly effective in giving the spacer-expander resiliency when it is circumferentially compressed.

A pair of rails 21 are assembled to the spacer-expander, one against each axial face. These, like the spacer-expander, are parted at 20 prior to installation of the ring in the cylinder. The rails are of conventional structure having a substantially greater radial width than axial thickness. Their radial width is greater than the radial width of the rail seats 12 and 12a (Fig. 4) whereby they project beyond the radial outer periphery of the spacer-expander. The radial inner periphery of the rails bears against the tangs 6. The tangs 6 provide a large number of closely spaced points of support for the rails whereby the radial thrust of the spacer-expander is evenly distributed around the rails.

The slight inclination of the ends of the tangs bearing against the rails urges the rails toward the sides 25 of the ring groove 26. This is called "wedging" and is itself a known structure in piston rings and forms no part of this invention.

The dimples 4 serve as a means of preventing excessive necklacing of the piston rings when they are installed. The use of these dimples permits the radial depth of the rails to be held to a minimum even when installed in a deep ring groove because they limit the radial shift of the rings after installation in the ring groove during installation of the piston and ring assembly in the cylinder. They occupy the space between the bight 13 of the ring and the bottom 27 of the ring groove (Fig. 4). However, it will be recognized that other means may be used for this purpose without changing the essential structure of the spacer-expander forming the principle of this invention.

The openness of the spacer-expander's structure materially reduces the tendency of carbon to form deposits on the ring structure. This increases the life and efficiency of the rings. This openness also reduces the area of contact between the rails and rail seats. The freedom of movement between the rails and the spacer-expander is increased permitting the rails to follow the cylinder walls 28 more precisely. The sealing efficiency of the piston ring is correspondingly improved.

This openness also reduces the mass of the spacer-expander. The inertial effects at the end of each stroke are thereby reduced permitting the piston ring to operate with less wear. The rails have greater freedom to adjust to the contour of the cylinder walls.

With its combination of low weight, openness and resiliency, the spacer-expander of this invention provides a piston ring of substantially improved operating characteristics. The piston ring is both more efficient and more durable and is markedly less subject to operational failure.

While a preferred embodiment of this invention has been described, it will be recognized that various modifications may be made without departing from the principle of this invention. Such modifications are to be considered as included in the hereinafter appended claims unless these claims by their language expressly state otherwise.

I claim:

1. A spacer for a piston ring comprising: a plurality of annuli spaced from each other; a web adjacent each annulus and joining said annuli one to the other; said annuli being bent along two parallel lines extending longitudinally of said spacer one on each side of said webs whereby said spacer has a generally U-shaped cross sectional configuration; said spacer being circular with said webs on the radial inner periphery thereof; tongue-like rail stops projecting from each side of certain of said webs beyond the axial faces of said spacer.

2. A spacer for a piston ring comprising: a plurality of annuli spaced from each other; a web adjacent each annulus and joining said annuli one to the other; said annuli being bent along two parallel lines extending longitudinally of said spacer one on each side of said webs whereby said spacer has a generally U-shaped cross sectional configuration; said spacer being circular with said webs on the radial inner periphery thereof; tongue-like rail stops projecting from each side of each of said webs beyond the axial faces of said spacer.

3. A spacer for a piston ring comprising: a plurality of annuli spaced from each other; a web adjacent each annulus and joining said annuli one to the other; said annuli being elongated in a direction normal to said webs and having rounded outer edge portions; said annuli being bent along two parallel lines extending longitudinally of said spacer one on each side of said webs whereby said spacer has a generally U-shaped cross sectional configuration; the outer edge portions of said annuli forming rail seats on opposite faces of said spacer; said spacer being circular with said webs on the radial inner periphery thereof; tongue-like rail stops projecting from each side of said webs beyond the outer faces of said rail seats.

4. A spacer for a piston ring comprising: a plurality of annuli and connecting webs alternately arranged in tandem; said annuli being elongated normal to and centered about the axis of said connecting webs and having rounded outer end portions; said annuli being bent along parallel lines one on each side of said connecting webs whereby said spacer has a U-shaped cross sectional configuration with the outer end portions of said annuli forming spaced parallel rail seats; said spacer being coiled with said connecting webs arranged along the radial inner periphery thereof; rail stop members integral with certain of said connecting webs.

References Cited in the file of this patent

UNITED STATES PATENTS

| | | |
|---|---|---|
| 2,482,990 | Olson | Sept. 27, 1949 |
| 2,568,655 | Olson | Sept. 18, 1951 |
| 2,760,835 | Shirk | Aug. 28, 1956 |